(12) United States Patent
Chen et al.

(10) Patent No.: US 7,818,465 B2
(45) Date of Patent: Oct. 19, 2010

(54) I/O MODULE EXPANSION UNIT AND DISTRIBUTED AUTOMATION SYSTEM

(75) Inventors: Wen-Yu Chen, Hsinchu County (TW); Kun-Hsin Ho, Taichung (TW)

(73) Assignee: ICP DAS Co., Ltd., Hsinchu County (TW)

( * ) Notice: Subject to any disclaimer, the term of this patent is extended or adjusted under 35 U.S.C. 154(b) by 94 days.

(21) Appl. No.: 11/979,474

(22) Filed: Nov. 5, 2007

(65) Prior Publication Data

US 2009/0077270 A1 Mar. 19, 2009

(30) Foreign Application Priority Data

Sep. 14, 2007 (TW) .............................. 96134568 A

(51) Int. Cl.
*G06F 3/00* (2006.01)
(52) U.S. Cl. .................. 710/8; 710/2; 710/10; 710/15; 710/16; 710/300
(58) Field of Classification Search ................ None
See application file for complete search history.

(56) References Cited

U.S. PATENT DOCUMENTS

| 5,117,351 | A | * | 5/1992 | Miller | 707/10 |
| 5,497,490 | A | * | 3/1996 | Harada et al. | 713/100 |
| 5,933,595 | A | * | 8/1999 | Iizuka et al. | 714/35 |
| 7,363,392 | B2 | * | 4/2008 | Thomas | 710/8 |
| 2006/0007620 | A1 | * | 1/2006 | Ochi | 361/93.1 |

* cited by examiner

*Primary Examiner*—Eron J Sorrell
(74) *Attorney, Agent, or Firm*—Rosenberg, Klein & Lee

(57) ABSTRACT

An I/O module expansion unit having slots to install I/O modules thereon is provided for a distributed automation system. With the I/O module expansion unit, storing the configuration checksums generated with an algorithm from the software and hardware information of I/O modules, the distributed automation system can simplify the identification of an I/O module. By directly writing the configuration parameters stored in the I/O module expansion unit into the installed I/O module, the distributed automation system can simplify the setting and replacement of an I/O module. The I/O module expansion unit may also fast detect a hot-swap of an I/O module by wiring to the slots.

21 Claims, 5 Drawing Sheets

I/O MODULE EXPANSION UNIT AND DISTRIBUTED AUTOMATION SYSTEM

FIELD OF THE INVENTION

The present invention is related generally to a control system and, more particularly, to a distributed automation system.

BACKGROUND OF THE INVENTION

As shown in FIG. 1, a distributed automation system typically includes one or more controller 10 and a plurality of I/O modules 102, 104, 106 connected by a communication network 12. The controller 10 may be a personal computer (PC), an industrial computer, a programmable logics controller, a programmable automation controller or any other type of control device, which gives commands to each of the I/O modules 102, 104 and 106 one by one by polling. The I/O modules 102, 104 and 106 may be various equipments combined with a sensor or an actuator such as pressure sensors, temperature sensors and flow rate sensors, and each has a unique address on the network for identification by the controller 10.

In a distributed automation system, each I/O module has a respective combination of model and configuration parameters, as shown in Table 1 for example. When the system starts up, the controller 10 will check the configuration parameters of each I/O module in the system. During the system in operation, the controller 10 also checks all I/O modules every specified time period to make sure that the configuration parameters of each I/O module are complete and correct. Whether or not the configuration parameters of these I/O modules are complete and correct determines the operation of the whole system is normal or not. Therefore, it is important to manage, verify, set and update these configuration parameters, especially when a new I/O module is added into the system or when an I/O module in the system is replaced. The process of verifying an I/O module by the controller 10, includes sending a command to the I/O module, sending the configuration parameters of the I/O module to the controller 10 in response to the command by the I/O module, reading these configuration parameters by the controller 10, and comparing these received configuration parameters with those in the database of the controller 10. If the configuration parameters are matching, it indicates the I/O module operates normally; otherwise the I/O module needs to be reset. The process of resetting an I/O module includes writing correct configuration parameters into the I/O module, and conducting verification through the above verifying process. Because the controller 10 needs to verify all I/O modules in the system when the system starts up, it will take a long time to wait for the system start-up, and a huge amount of communications are created. Similarly, it takes a long time for the controller 10 to check all I/O modules every specified time period during the system operation, and a huge amount of communications are also created.

There are two conventional setting methods for replacing an I/O module or adding a new I/O module:

1. Manual Operation

A system maintainer uses a specific setting tool, such as a notebook computer or a PC with a setting program installed therein, to completely set the configuration parameters of an I/O module, for example, to set parameters such as the power on value, the safe value, the high alarm/low alarm, the working range of the input signals (e.g. ±10V, ±5.0V, ±20 mA), the communication speed and so on. Then, the I/O module is connected to the distributed automation system.

An I/O module generally has dozens of configuration parameters to be set. When the configuration parameters of a distributed automation system are of a great number and complicated, a document or an electronic file is used as a backup. Once an I/O module needs to be replaced, the backup is used to obtain the configuration parameters for setting the I/O module. In addition, the manual operation is slow and errors often occur. Thus, during the operation of setting the configuration parameters of I/O modules such as replacing the I/O modules and the system maintenance, the maintainer needs to bring the setting tool to the location of the automation system so as to proceed with the correction of the configuration parameters. Besides, the maintainer who updates and sets the configuration parameters of I/O modules needs to be well trained to be familiar with the operation of the setting software, and therefore the training cost on the maintainer is increased.

2. Semi-Automatic Operation:

This operation improves the manual operation by completing some basic communication settings of an I/O module, such as the communication speed and the unique address on the network, by adjusting a jumper, a DIP switch, a rotary switch or a combination thereof, before connecting the I/O module to the automation system. For the other configuration parameters, the controller 10 which has the correct configuration parameters stored therein will read the configuration parameters on the I/O module through the communication network 12, and compare them one by one with the configuration parameters it stores on itself. If not matched, the correct configuration parameters will be written into the I/O module by the controller 10 again. FIG. 2 shows a flow chart of a conventional semi-automatic operation. The controller 10 first verifies the model of the I/O module is correct, reads the configuration parameters stored previously in the database of the controller 10, and then compares the configuration parameters read from the I/O module one by one. If the parameters are not matched, the correct configuration parameters are written into the I/O module and are compared again for confirmation, and then the checking and setting process for a next I/O module proceeds. As such, each I/O module is compared one by one until all I/O modules in the system are verified.

TABLE 1

| Addr. | Model | Software Version | Configuration Parameter 1 | Configuration Parameter 2 | ... | Configuration Parameter n |
|---|---|---|---|---|---|---|
| 1 | AI_Type | 1.0 | "AI_High" | "AI_Low" | ... | "AI_Alarm" |
| 2 | AO_Type | 1.0 | "AO_PowerOn" | "AO_SafeValue" | ... | "AO_Alarm" |
| 3 | AO_Type | 1.0 | "AO_PowerOn" | "AO_SafeValue" | ... | "AO_Alarm" |
| . | . | . | . | . | . | . |
| . | . | . | . | . | . | . |
| . | . | . | . | . | . | . |
| m | DO_Type | 1.0 | "DO_PowerOn" | "DO_SafeValue" | ... | "DO_FF" |

Although the semi-automatic operation reduces some work in the manual operation, when the number of I/O modules is large or the configuration parameters are many, the method of comparing the configuration parameters one by one increases the network communications. Besides, it takes a long time for the controller 10 to read, compare and set the configuration parameters and thus starting of the system is slow. U.S. Pub. No. 2005/0262101 discloses a distributed automation system using a semi-automatic setting method, which stores preset commands in a memory in sequence to be written into the I/O module sequentially when automatic setting of the configuration parameters is performed. Before performing the setting, the controller first asks the I/O module to be set with configuration parameters and after it is confirmed that the preset value can be changed according to the feedback signal, changes the configuration parameters, and afterwards confirms whether the execution result is correct or not. Such setting method can make sure that the controller transmits the configuration parameters correctly to the I/O module; however, when the number of the I/O modules is large, there are still four problems:

(1) The time consumed when the controller sets the configuration parameters of the I/O modules increases in proportion to the number of the I/O modules.

(2) When the system is huge and therefore the communication data required by the system configuration verification at system start-up has a large amount, it takes a long time to perform the verification and thus the system start-up is delayed.

(3) The controller needs to ask and then know if the I/O module can or needs to update the configuration parameters. In other words, when an I/O module is replaced, the new I/O module cannot actively notify the controller to perform an update of the configuration parameters.

(4) Each I/O module has software working therein, and different versions of the software may be installed in the I/O modules of the same model due to different production dates, resulting in the difference of the functions provided or operation manners. Such automation system cannot verify this item and thus there is a potential risk that the whole system operates incorrectly when the software versions of the I/O modules are different.

Therefore, it is desired a method and apparatus for improving the reliability and setting speed of a distributed automation system.

SUMMARY OF THE INVENTION

One object of the present invention is to provide an I/O module expansion unit for a distributed automation system.

Another object of the present invention is to provide a method for fast verification of an I/O module in a distributed automation system.

Still another object of the present invention is to provide a method for fast setting of an I/O module in a distributed automation system.

Yet another object of the present invention is to provide a method for fast replacement of an I/O module in a distributed automation system.

Yet still another objective of the present invention is to provide a method for fast hot-swap detection of an I/O module in a distributed automation system.

Still another object of the present invention is to provide a distributed automation system with a fast setting speed.

Still another object of the present invention is to provide a distributed automation system with high reliability.

According to the present invention, an I/O module expansion unit for a distributed automation system has a plurality of expansion slots for I/O modules to install thereon, and the I/O module expansion unit stores each configuration checksum for the I/O modules to be installed on its slots, such that each configuration checksum stored in the I/O modules installed on the slots could be compared with those stored in the I/O module expansion unit, to identify the installed I/O modules and thereby verify the configuration parameters thereof by the I/O module expansion unit but not by the controller of the distributed automation system. With the comparison between the configuration checksums previously stored in the I/O modules and in the I/O module expansion unit, it takes less time to identify all I/O modules and verify their configuration parameters for the distributed automation system, and the communications will be dramatically reduced. Therefore, the lead-time required for starting up the distributed automation system and the time spent for routine checks during the system operation are also reduced.

Preferably, the I/O module expansion unit also stores the configuration parameters for the I/O modules to be installed, and when the configuration checksum stored in the I/O module on the slot is found not matched to that stored in the I/O module expansion unit or when an I/O module is being replaced, the I/O module expansion unit could write the configuration parameters thereof into the I/O module on the slot directly, without any help from the controller of the distributed automation system.

Preferably, the I/O module expansion unit also has a hot-swap detection unit to support hot-swap of I/O module.

Preferably, the I/O module expansion unit further includes a status indication unit to display whether or not the setting of I/O module is successful, the failure reason, the working status of the installed I/O modules and so on.

BRIEF DESCRIPTION OF THE DRAWINGS

The present invention can be more fully understood by reading the subsequent detailed description and embodiments with references made to the accompanying drawings, wherein.

DETAIL DESCRIPTION OF THE INVENTION

For reducing the time needed to start up a distributed automation system and to verify the I/O modules thereof, and the network communications between the controllers of the distributed automation system and the I/O modules, an I/O module expansion unit is provided for the distributed automation system. Since each I/O module of a distributed automation system has a plurality of configuration parameters, these configuration parameters are bring into calculation with an algorithm to generate a unique configuration checksum when first setting the I/O module, and the resulting configuration checksum is stored in the I/O module. Many algorithms could be used to generate the configuration checksum, for example the check sum method, cyclic redundancy check (CRC), message digest algorithm 5 (MD5), data encryption standard (DES) process, advanced encryption standard (AES) process, Rivest, Shami and Adleman (RSA) encryption method, safe-Hash algorithm 1 (SHA-1), Rivest Cipher 6 (RC6) method, wired equivalent privacy (WEP) process, or any other which are capable of generating a unique number.

Figure 1:
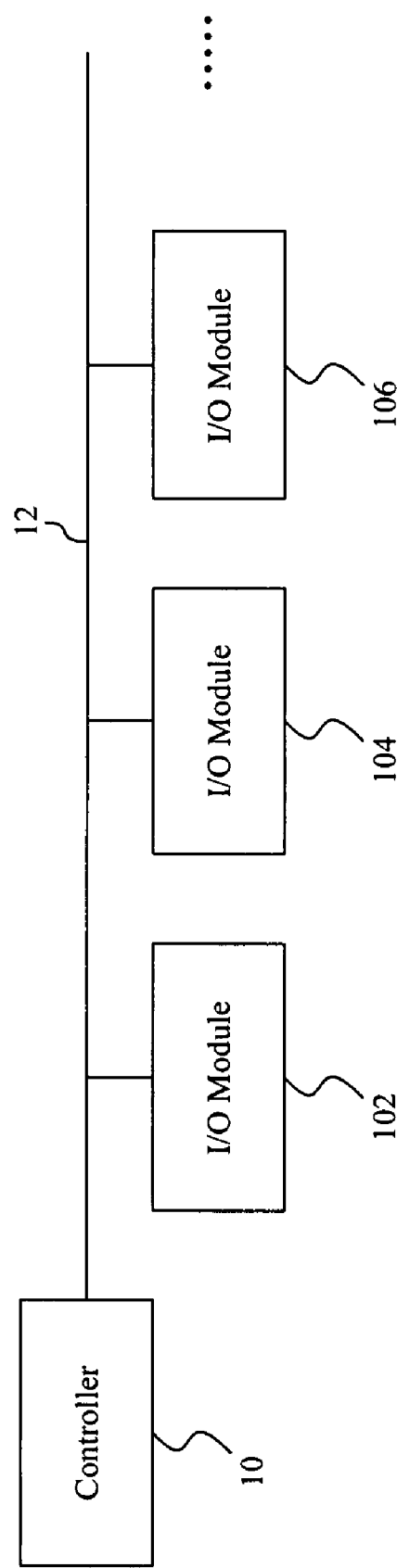
FIG. 1 is a system block diagram of a conventional distributed automation system.
Figure 2:
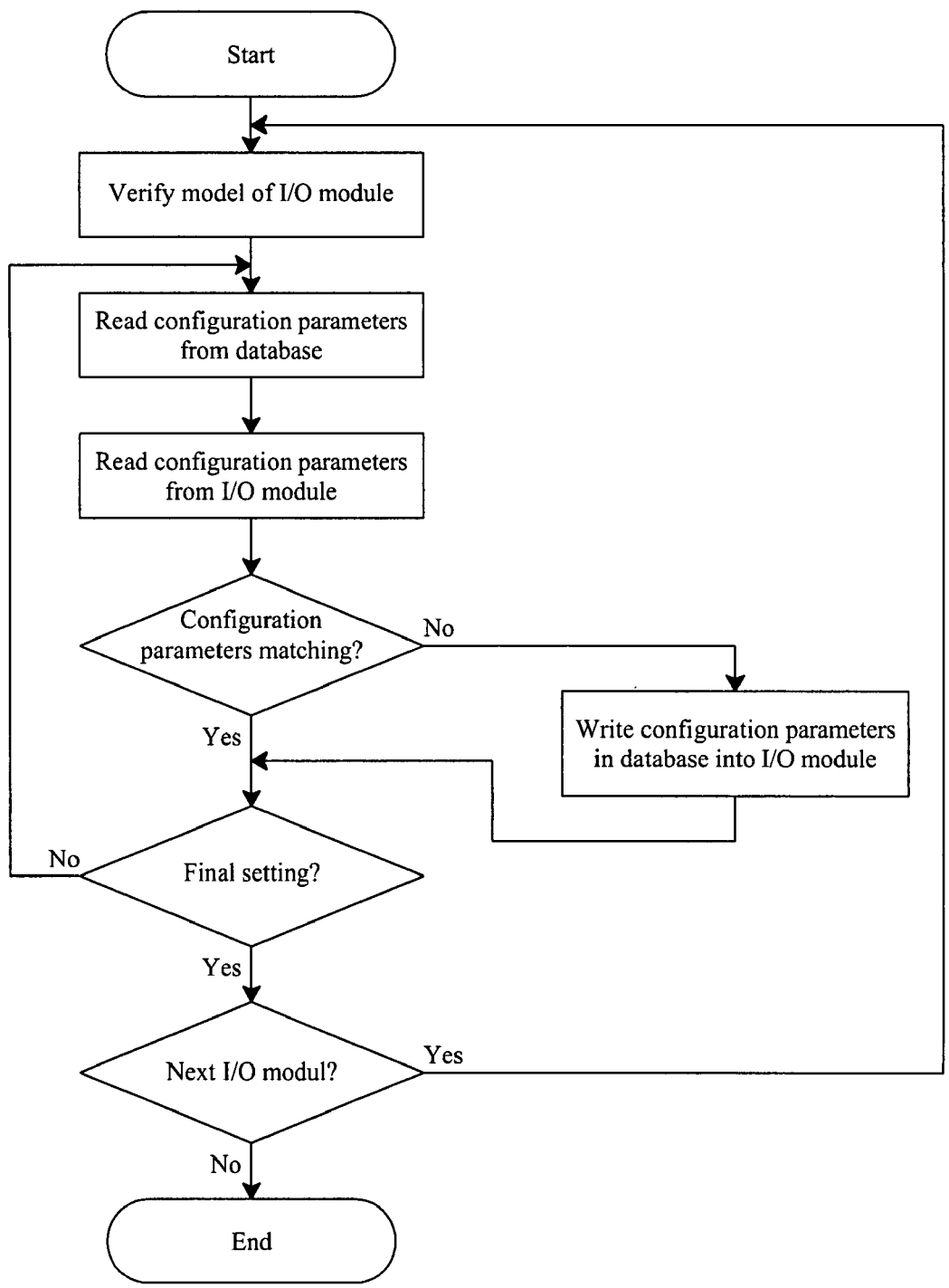
FIG. 2 is a flow chart of a conventional semi-automatic operation.
Figure 3:
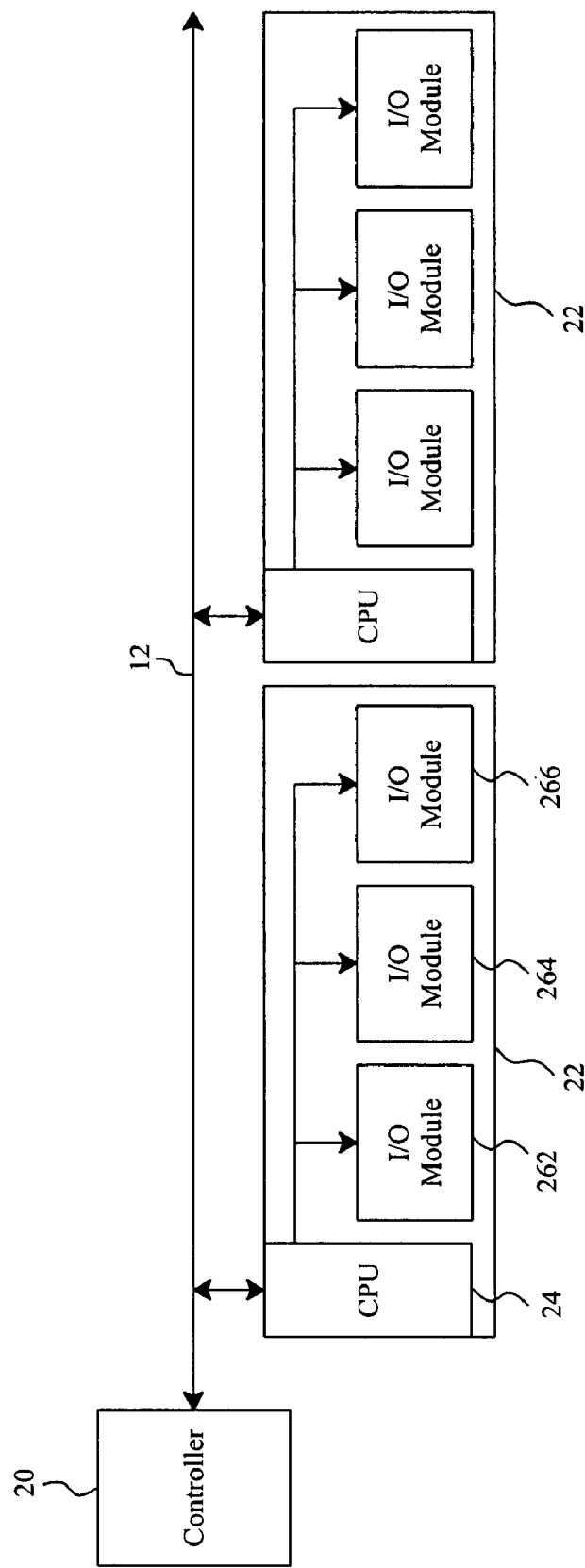
FIG. 3 is a system block diagram of a distributed automation system according to the present invention.

FIG. 3 shows a distributed automation system according to the present invention, in which a controller 20 is connected to several I/O module expansion units 22 by a communication network 12, and each one of the I/O module expansion units 22 and I/O modules 262, 264 and 266 has a unique address on the network. The communication network 12 may be RS-232, RS-422, RS-485, radio modem, Ethernet, WiFi, GPRS, WiMAX, Zigbee, optical fiber or any other wired or wireless network. The controller 20 may be one the same as a conventional controller, but a lot of works are omitted as described later. The I/O modules 262, 264 and 266 are installed on the I/O module expansion unit 22 and under the control of a CPU 24. The controller 20 may transmit commands to the I/O module expansion units 22 and the I/O modules 262, 264 and 266 installed thereon according to their addresses.

When the I/O modules 262, 264 and 266 are installed on the expansion unit 22 first time, the I/O module expansion unit 22 will store the configuration checksum and the configuration parameters of each I/O module into the CPU 24 according to the address of each I/O module. In an embodiment, the CRC 32 calculation is employed to generate a respective configuration checksum for each I/O module from its software and hardware information, such as the address, model, software version (operating system or firmware), configuration parameters and so on, as shown in Table 2. By only comparing a configuration checksum, it is fast to identify an I/O model and verify its software version and each configuration parameter as described later.

First, a setting tool, such as a PC, is used to perform an algorithm to obtain a configuration checksum for an I/O module. For instance, the address, model, software version and all configuration parameters of the I/O module 262 are calculated by the algorithm to obtain a number, which is referred to as a configuration checksum, as listed in Table 2. Thus, if there is any variation in the input data to the algorithm, the configuration checksum obtained varies. In other words, even the model, configuration parameters and software are the same in an I/O module, different addresses will result in different configuration checksums obtained. The configuration checksum can be obtained by calculation like a common data debug algorithm such as a sum check, CRC and WEP. In an embodiment, the CRC 32 algorithm is used and it may obtain 232 sets of configuration checksums.

After the configuration checksum of the I/O module 262 is obtained, the configuration parameters of the I/O module 262 and the configuration checksum are stored in the CPU 24 according to the address thereof, and also are written in the I/O module 262 at the same time. As such, the calculation and store are performed on each I/O module installed on the expansion unit 22.

Thereafter, when the system starts up or an I/O module is being replaced, the I/O module expansion unit 22 gives commands to the I/O module, and the configuration checksum of the I/O module is read and then compared with the configuration checksum stored in the I/O module expansion unit 22. If the comparison result is matching, the configuration parameters of the I/O module are confirmed correct; otherwise the configuration parameters and the configuration checksum stored in the I/O module expansion unit 22 are written into the I/O module directly. Compared with the conventional system in which the controller 10 reads all configuration parameters one by one from each I/O module and then proceeds with the comparison, and then writes the configuration parameters needed to be updated into the I/O modules, the I/O module expansion unit 22 according to the present invention provides a simpler and faster identification and setting method for the distributed automation system.

Thereby, when a certain I/O module of the distributed automation system is being replaced or when the configure parameters of a certain I/O module is being verified, the I/O module expansion unit 22 only compares the stored configuration checksum with that of the connected I/O module according to its address, and then the I/O modules which need to set the configuration parameters can be verified quickly. Then, the configuration parameters are written into the I/O modules which need to set or update the configuration parameters, and it is not needed to read all the configuration parameters one by one from the I/O module, and thus the time spent on reading the configuration parameters from the I/O module and the communications are significantly reduced. The job of verifying and updating the configuration parameters which are originally concentrated on the controller 20 are now distributed to each I/O module expansion unit 22, and each I/O module expansion unit 22 is responsible for verifying and updating the configuration parameters of a portion of the I/O modules in the whole distributed automation system, and thus the controller 20 only needs to communicate with the I/O module expansion units 22 to know if the configuration parameters of the I/O modules in the whole distributed automation system are verified and set. The work of the controller 20 is dramatically reduced accordingly, and the lead-time before the system operates is also dramatically reduced.

Figure 4:
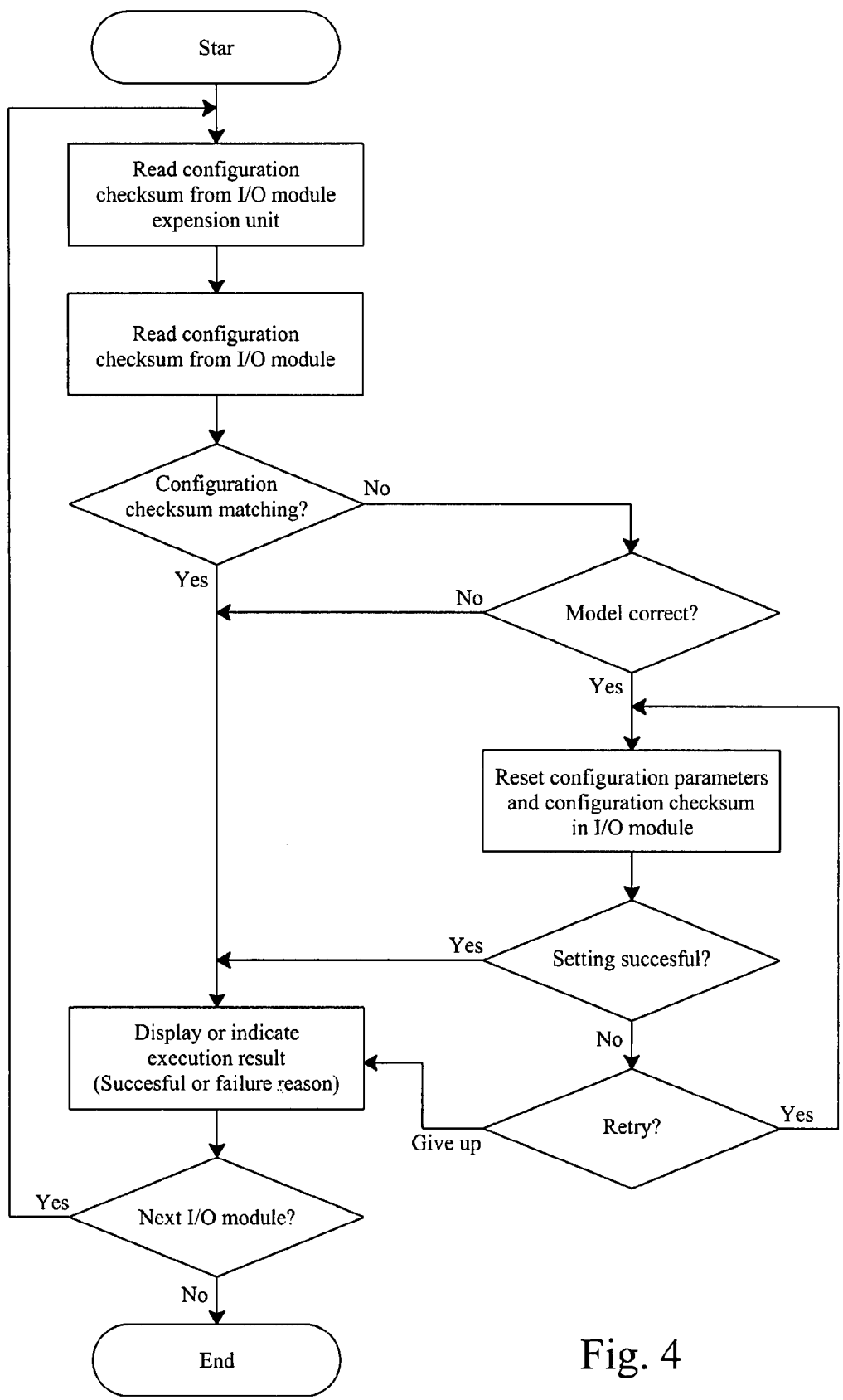
FIG. 4 is a flow chart of setting an I/O module according to the present invention.

FIG. 4 is a flow chart of setting an I/O module according to an embodiment of the present invention. The I/O module expansion unit 22 reads the configuration checksum previously stored therein, and then reads the configuration checksum from the I/O module to be identified for comparison. If not matching, the model of the I/O module is first checked. If the model is not correct, a failure execution is displayed. If the model is correct, the configuration parameters and the con-

TABLE 2

| Addr. | Model | Software Version | Configuration Parameter 1 | Configuration Parameter 2 | ... | Configuration Parameter n | Configuration Checksum |
|---|---|---|---|---|---|---|---|
| 1 | AI_Type | 1.0 | "AI_High" | "AI_Low" | ... | "AI_Alarm" | "1111" |
| 2 | AO_Type | 1.0 | "AO_High" | "AO_Low" | ... | "AO_Alarm" | "2222" |
| 3 | AO_Type | 1.0 | "AO_High" | "AO_Low" | ... | "AO_Alarm" | "2223" |
| . | . | . | . | . | . | . | . |
| . | . | . | . | . | . | . | . |
| . | . | . | . | . | . | . | . |
| m | DO_Type | 1.0 | "DO_AA" | "DO_BB" | ... | "DO_FF" | "xxxx" | figuration checksum for the I/O module stored in the I/O module expansion unit 22 are written into the I/O module directly, and then the setting is checked to be successful or not. If not successful, repeated aforementioned steps proceed until a certain times of repeated trials and then a failure execution is displayed. If the comparison result of the configuration checksums is matching, that is, the configuration checksum stored in the I/O module is correct, then a successful comparison is displayed, and then whether there is a next I/O module needing comparison is checked. If there is one, the configuration parameters are read from the I/O module expansion unit 22 again and from the next I/O module for comparison. If there is not, the setting process terminates.

For ensuring the accuracy and completeness of the whole setting of the distributed automation system, when the configuration parameters of the I/O module is set in the preferred embodiment, each configuration parameter has its corresponding command and responding value. According to the responding value sent from the I/O module, the setting result is successful or not is known. For the configuration parameters which are set in failure, a further repeated trial or neglect can be performed to ensure the configuration parameters of the whole distributed automation system to be correct and complete.

Figure 5:
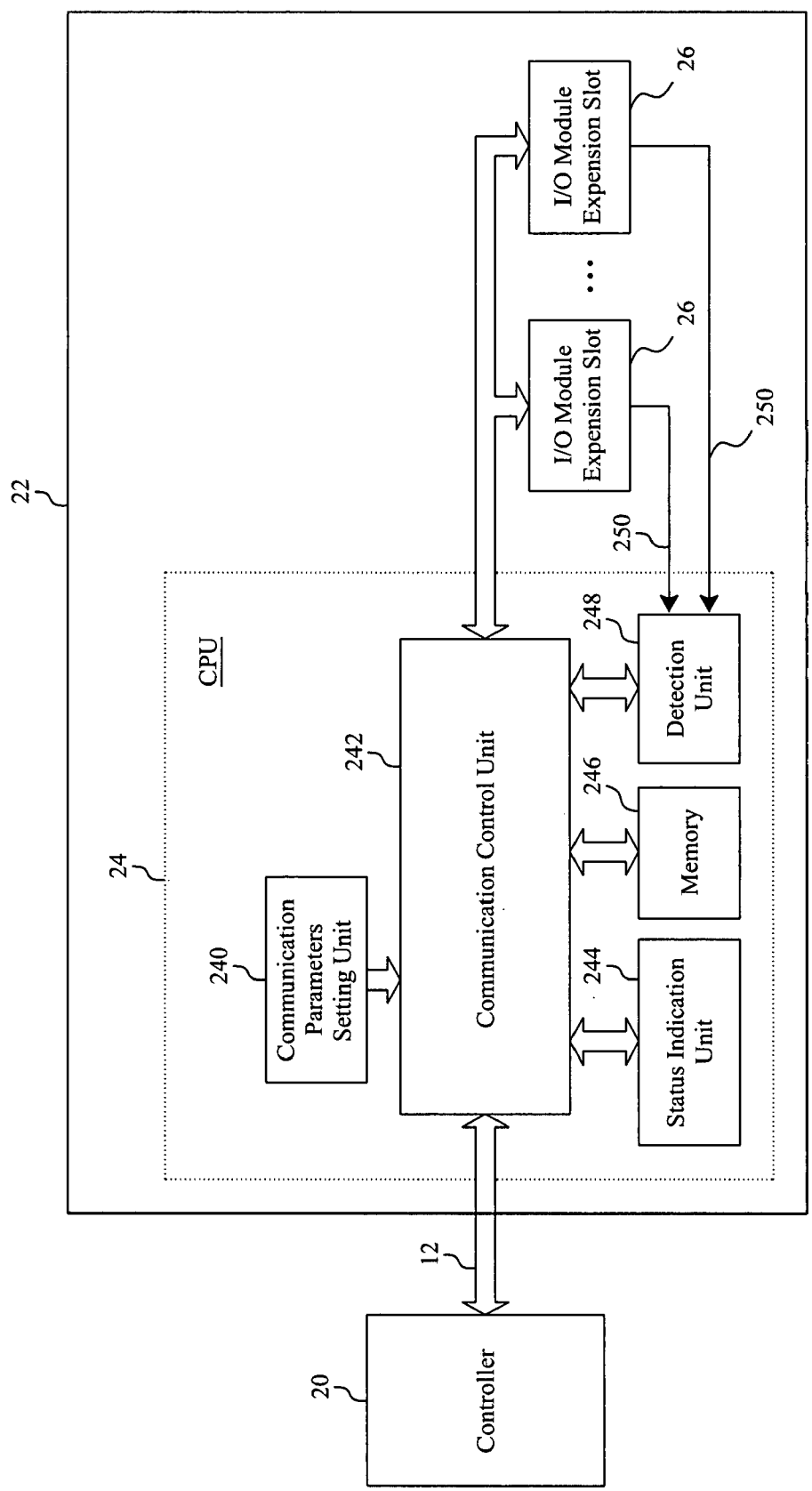
FIG. 5 is an embodiment for the I/O module expansion unit of FIG. 3.

FIG. 5 provides an embodiment for the I/O module expansion unit 22 of FIG. 3, in which the CPU 24 includes a communication parameters setting unit 240 such as a conventional jumper, a DIP switch, a rotary switch or a combination thereof. A maintainer provides a communication control unit 242 with some basic communication settings, for example basic communication parameters such as communication speed, the unique address on the network and so on by the communication parameters setting unit 240, so that the communication control unit 242 can communicate with the I/O module on an expansion slot 26 of the I/O module expansion unit 22. A memory 246 such as ROM, flash memory, EEROM, FRAM, hard disk and so on is provided for storing addresses, configuration checksums and configuration parameters of each I/O module. In this embodiment, a detection unit 248 is further disposed and is connected to the expansion slot 26 of the I/O module by a signal wire 250. When an I/O module is hot-swap on the expansion slot 26, the electrical level on the signal wire 250 varies, for example, from voltage of 0V to 5V, and this hot-swap signal is used for notifying the detection unit 248 that there is a hot-swap of an I/O module. The job of monitoring if there is a hot-swap of an I/O module by the detection unit 248 can be done by polling all the slots 26, or by the hot-swap signal which interrupts the detection unit 248. Thereby, it is fast to know if an I/O module is inserted or removed and then inform the communication control unit 242 to terminate the communications between the corresponding I/O module and the controller 20. Such design prevents the controller 20 from communicating with the I/O module before the configuration parameters of the I/O module are set and prevents from resulting in some unexpected actions. According to this mechanism, the distributed automation system does not need to halt when any I/O module is being replaced.

In this embodiment, a status indication unit 244 is further disposed to display the success, failure or failure reason of setting the configuration parameters. After the I/O module expansion unit 22 sets the I/O module automatically and the result is known, if the setting is failed, the status indication unit 244 can generate a light, sound, image, text or so on to notify the maintainer to eliminate the error. For example, an LED is used as the status indication unit 244 and programmed as below:

LED is always dark: setting is successful;
LED twinkles quickly: setting in progress;
LED twinkles slowly: no I/O module is allowed to be inserted here;
LED twinkles quickly and slowly in turns: the I/O module model is wrong; and
LED is always on: setting is failed.

When the I/O module is being replaced, the original I/O module is removed and the new one is inserted, and then the whole connecter head moves to the new I/O module. Then, the LED signal on the I/O module expansion unit 22 is confirmed correct by visual inspection to confirm that the new I/O module is working normally. Therefore, when the automation system is maintained, the maintainer dose not need to use a computer at the location of the automation system, and the working status of the I/O module or the failure reason is easily distinguished without being familiar with the program setting.

Another characteristic of the present invention is that all configuration parameters of the distributed automation system can be copied quickly. For instance, the I/O module expansion unit 22 provides a command to write or read the data stored in the memory 246, and thus the controller 20 can read all content in the memory 246 of the I/O module expansion unit 22 and backup it to configuration parameter files. When a system needs the same configuration parameters, the backup configuration parameter files in the controller 20 can be written one by one to another I/O module expansion unit, and thus the configuration parameters of the I/O modules can be copied quickly.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An I/O module expansion unit for a distributed automation system, comprising:
    a plurality of expansion slots, each for installing an I/O module having a respective configuration checksum thereon; and
    a CPU connected to the expansion slots, for storing a plurality of configuration checksums and therefore identifying each of installed I/O modules by comparing the configuration checksums stored in the installed I/O modules with the configuration checksums stored in the CPU;
    wherein the respective configuration checksum is a number or code computed based on I/O module hardware and software information including address of the expansion slot, software version of the I/O module, and model number of the I/O module, and the respective configuration checksum has the same value if the I/O module hardware and software information remains unchanged.

2. The I/O module expansion unit of claim 1, wherein the CPU comprises:
    a memory for storing the configuration checksums and addresses of the corresponding I/O modules;
    a communication control unit for performing a configuration checksums comparison according to the addresses; and
    a communication parameters setting unit for providing basic communication parameters to the communication control unit such that the communication control unit can communicate with the installed I/O modules.

3. The I/O module expansion unit of claim 2, wherein the memory stores configuration parameters for the I/O modules corresponding to the configuration checksums stored in the CPU.

4. The I/O module expansion unit of claim 2, wherein the communication parameters setting unit comprises a jumper, a DIP switch, a rotary switch, or a combination thereof, for determining the basic communication parameters.

5. The I/O module expansion unit of claim 1, wherein the CPU comprises:
   a communication control unit for controlling communications between the installed I/O modules and a controller of the distributed automation system; and
   a detection unit for generating a hot-swap signal to signal the communication control unit when there is an I/O module hot-swap on the expansion slots, so as to break the communications between the hot-swap I/O module and the controller.

6. The I/O module expansion unit of claim 1, wherein the CPU comprises a status indication unit for displaying a working status of the installed I/O modules.

7. The I/O module expansion unit of claim 6, wherein the status indication unit uses a light, a sound, an image or a text to display the working status of the installed I/O modules and provide various alarms.

8. A method for fast identifying a configuration of an I/O module in a distributed automation system, comprising the steps of:
   (a) generating a configuration checksum with an algorithm from a software and hardware information of the I/O module including address of a slot, software version of the I/O module, and model number of the I/O module;
   (b) storing the configuration checksum in the I/O module and in a memory outside the I/O module, respectively; and
   (c) comparing the configuration checksum stored in an I/O module to be identified with the configuration checksum stored in the memory;
   wherein the configuration checksum has the same value if the software and hardware information of the I/O module remains unchanged.

9. The method of claim 8, wherein the algorithm comprises Check Sum, CRC, MD5, DES, AES, RSA, SHA-1, RC6, WEP or any other capable of generating a unique number.

10. The method of claim 8, wherein the software and hardware information comprises a model, software version and configuration parameters of the I/O module.

11. The method of claim 8, wherein the step (c) is performed when the distributed automation system starts up.

12. The method of claim 8, wherein the step (c) is performed during a hot-swap of the I/O module.

13. The method of claim 8, wherein the step (c) is performed each time period.

14. A method for fast setting an I/O module in a distributed automation system which has a CPU to control communications between the I/O module and a controller of the distributed automation system, the method comprising the steps of:
   storing an address information and configuration parameters for the I/O module in the CPU;
   according to the address information stored in the CPU, writing the configuration parameters stored in the CPU into the I/O module directly, without reading configuration parameters from the I/O module;
   storing a configuration checksum in the CPU; and
   writing the configuration checksum into the I/O module;
   wherein the configuration checksum is a number or code generated with an algorithm from a software and hardware information of the I/O module including the address information and configuration parameters, software version of the I/O module, and model number of the I/O module, and the configuration checksum has the same value if the I/O module hardware and software information remains unchanged.

15. A method for replacing an I/O module in a distributed automation system which has a CPU to control communications between the I/O module and a controller of the distributed automation system, the method comprising the steps of:
   terminating the communications between the I/O module and the controller;
   after installing a new I/O module on a slot, verifying or setting configuration parameters of the new I/O module by the CPU;
   restoring the communications between the new I/O module and the controller;
   storing a configuration checksum in the CPU; and
   writing the configuration checksum into the new I/O module;
   wherein the configuration checksum is a number or code generated with an algorithm from a software and hardware information of the I/O module including address of the slot, software version of the I/O module, and model number of the I/O module, and the configuration checksum has the same value if the I/O module hardware and software information remains unchanged.

16. A method for fast detection of a hot-swap of an I/O module in a distributed automation system, the I/O module installed on a slot, the method comprising the steps of:
   (a) connecting a detection unit in an I/O module expansion unit having the slot to the slot with a signal wire;
   (b) in response to the hot-swap of the I/O module, generating an electrical variation on the signal wire; and
   (c) detecting the electrical variation for identifying the hot-swap of the I/O module, wherein the I/O module stores a configuration checksum to be identified by a CPU in the I/O module expansion unit;
   wherein the configuration checksum is a number or code generated with an algorithm from a software and hardware information of the I/O module including address of the slot, software version of the I/O module, and model number of the I/O module, and the configuration checksum has the same value if the I/O module hardware and software information remains unchanged.

17. The method of claim 16, wherein the step (c) comprises polling the slot by the detection unit.

18. The method of claim 16, wherein the step (c) comprises interrupting the detection unit by the electrical variation.

19. A distributed automation system comprising:
   one or more controllers;
   one or more I/O module expansion units for connecting to the one or more controllers by a communication network; and
   one or more I/O modules installed on the one or more I/O module expansion units, each of the one or more I/O modules for receiving and executing a command given by one of the one or more controllers or by one of the one or more I/O module expansion units, responding an execution result to the one giving the command, and after a power on, sending a signal to notify an address thereof to the I/O module expansion unit that it is installed;
   wherein each of the one or more I/O module expansion units stores one or more configuration checksums for identifying the I/O modules installed thereon, each of the one or more configuration checksums is a number or code generated with an algorithm from a software and hardware information of the I/O module including address of the I/O module expansion units, software version of the I/O modules, and model number of the I/O modules, and the configuration checksum has the same value if the I/O modules' hardware and software information remains unchanged.

20. The distributed automation system of claim 19, wherein each of the one or more I/O module expansion units stores one or more configuration parameters for automatically setting the I/O modules installed thereon.

21. The distributed automation system of claim 19, wherein each of the one or more I/O module expansion units terminates communications between one or more I/O modules installed thereon and the one or more controller during a process.

* * * * *